United States Patent Office 3,363,004
Patented Jan. 9, 1968

3,363,004
PROCESS FOR THE PREPARATION OF
DIALKOXYNITROSTILBENE
Adnan A. R. Sayigh, North Haven, and Henri Ulrich, Northford, Conn., assignors to The Upjohn Company, Kalamazoo, Mich., a corporation of Delaware
No Drawing. Filed Sept. 14, 1964, Ser. No. 396,345
9 Claims. (Cl. 260—613)

ABSTRACT OF THE DISCLOSURE

The yield of dialkoxynitrostilbene obtained by condensing the appropriate dialkoxybenzaldehyde and nitrophenylacetic acid is increased by carrying out the reaction in two steps instead of the single step shown in the prior art. The initial condensation is carried out at 65° C. to 100° C. to form the intermediate cinnamic acid and the latter is decarboxylated by raising the temperature in the second step to 130° C. to 170° C. The dialkoxystilbenes are intermediates in the preparation of photographic developers.

---

This invention relates to the preparation of dialkoxynitrostilbenes and in particular is concerned with an improved method of preparing such compounds by the condensation of the appropriate dialkoxybenzaldehyde and the appropriate nitrophenylacetic acid.

Previous attempts to prepare dialkoxynitrostilbenes by condensation of the appropriately substituted benzaldehyde and the appropriate phenylacetic acid have given the desired product in low yield. The condensation can be represented by the following equations:

$$RCHO + R'CH_2COOH \rightarrow RCH=C(R')COOH + H_2O$$

$$RCH=C(R')COOH \rightarrow RCH=C(R')H + CO_2$$

The prior art methods have sought to carry out the above two steps in one single operation by carrying out the reaction at a temperature such that the intermediate unsaturated acid is decarboxylated as it is formed. For example, Kauffmann, Ber., 54, 795, (1921) described the preparation of 2,5-dimethoxybenzaldehyde with 4-nitrophenylacetic acid in the presence of piperidine at a temperature of 150° C. The yield of product obtained in this one step reaction was 35%. In U.S. Patent 3,019,107 the same reaction is described except that the temperature employed was raised to 160° C. The yield of product was 38%.

It has now been found, surprisingly and unexpectedly, that it is possible to obtain a substantially increased yield of dialkoxynitrostilbenes by carrying out the reaction of the appropriate dialkoxybenzaldehyde and the appropriate phenylacetic acid in two stages instead of the single stage disclosed in the prior art. It has also been found that the use of an inert organic solvent in the reaction contributes to the increased yield.

The dialkoxystilbenes produced according to the invention are useful as intermediates in the preparation of photographic chemicals. For example, these compounds can be converted to the corresponding aminophenethylhydroquinones using the reduction of dealkylation procedures described in U.S. Patent 3,019,107 and the hydroquinones so obtained are useful as developing agents in photography in accordance with the aforesaid U.S. Patent. It will be appreciated that the substantial increase in yield in the production of dialkoxystilbenes using the process of the invention has resulted in significant reduction of cost of these important intermediates.

The process of the invention comprises an improved process for the preparation of a stilbene having the formula:

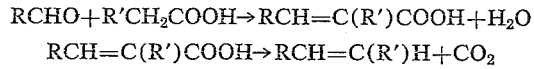

$$R-CH=CH-R'$$

wherein R represents dialkoxyphenyl and R' represents phenyl substituted by from 1 to 2 nitro groups by condensing in the first step the appropriate aldehyde R—CHO and the appropriate acid R'—CH$_2$—COOH in the presence of an inert organic solvent and an alicyclic secondary amine, at a temperature such that condensation occurs without concurrent decarboxylation and, in a second step, heating the unsaturated acid R—CH=C(R')—COOH so formed to a temperature at which decarboxylation takes place.

The first step of the process of the invention can be carried out conveniently by using an inert organic solvent which forms an azeotrope with water at a temperature which is below that at which the intermediate unsaturated acid is decarboxylated and preferably at a temperature within the range of about 65° to about 100° C. Examples of such solvents are benzene, toluene, xylene, and the like.

The second step of the process, namely the decarboxylation, is carried out by heating the reaction product from the first step to a temperature at which decarboxylation occurs. Advantageously, the temperature for this step is within the range of about 130 to 170° C. when the reaction is carried out at normal pressure. This second step can be accomplished conveniently by removing, for example, by distillation a part or all of the solvent employed in the first stage and replacing it by a higher boiling solvent which has a boiling point within or above the range of temperature indicated above. Examples of such solvents are xylene, mesitylene, ethylbenzene, chlorobenzene, o-dichlorobenzene, p-chlorotoluene, decalin, tetralin, and the like.

In an alternative mode of procedure within the scope of the invention, the first stage of the process is carried out using a solvent which has a boiling point sufficiently high to enable it to be used in the second stage. Under such circumstances the first stage is conducted under reduced pressure so chosen that the temperature at which the reaction mixture refluxes is brought within the desired temperature range for the first stage of the reaction. After the first stage of the reaction is completed, as indicated by elimination of the theoretical quantity of water from the reaction mixture, the reaction mixture is allowed to return to atmospheric pressure and the temperature of the mixture is raised to that required for decarboxylation in the second stage.

Alternatively, where the solvent employed in the first stage has a boiling point at atmospheric pressure which is below the reaction temperature required in the second stage, the latter can be carried out by taking the total reaction mixture from the first stage and heating it within a closed vessel to a temperature within the range quoted above for the second stage of the reaction.

The progress of the first stage of the reaction can be followed conveniently by measuring the amount of water eliminated and the progress of the second stage can be followed by measuring the amount of carbon dioxide eliminated.

The dialkoxybenzaldehyde and the nitrophenylacetic acid employed in the process of the invention are advantageously present in substantially equimolar proportions. Optimum yields are found to be produced when the nitrophenylacetic acid is employed in a slight excess, i.e., of the order of about 1.1 moles of nitrophenylacetic acid per mole of dialkoxybenzaldehyde. The secondary amine is advantageously present in the reaction mixture in a concentration of the order of about 0.1 mole to about 1.0 mole per mole of the dialkoxybenzaldehyde. Smaller amounts of the amine can be employed in the first stage of the reaction if desired but preferably the amine is present in the second stage in a proportion within the range of 0.5 to 1.0 mole per mole of dialkoxybenzaldehyde. If less than 0.5 mole of amine per mole of aldehyde is employed in the first stage, further amine is added before the second stage is commenced to bring the concentration of amine to the preferred range.

The dialkoxybenzaldehydes employed in the process of the invention are benzaldehydes substituted by two lower-alkoxy groups one of which is preferably in an ortho or para position with respect to the other. The term "lower-alkoxy" means methoxy, ethoxy, propoxy, butoxy, pentlyoxy, hexyloxy, heptyloxy, octyloxy, and isomeric forms thereof. Examples of dialkoxybenzaldehydes which can be used in the process of the invention are: 2,5-dimethoxybenzaldehyde, 2,4 - dimethoxybenzaldehyde, 2,3 - dimethoxybenzaldehyde, 2,5-diethoxybenzaldehyde, 2,5-diisopropoxybenzaldehyde, 2,5 - dihexyloxybenzaldehyde, and the like.

The nitrophenylacetic acids employed in the process of the invention are phenylacetic acids which carry at least one nitro group, preferably in the para position, and which can also carry a second nitro group, preferably in the ortho position. Examples of such compounds are: 4-nitrophenylacetic acid, 2,4-dinitrophenylacetic acid, 3-nitrophenylacetic acid, 3,4-dinitrophenylacetic acid, and the like.

The alicyclic secondary amines which can be employed in the process of the invention are 5 to 7 ring atom aliphatic cyclic amines which, in addition to the amino N atom in the ring, can also contain a second hetero ring atom selected from the class consisting of nitrogen, sulfur, and oxygen. Examples of such amines are pyrrolidine and C-alkylpyrrolidines such as 2-methylpyrrolidine, 2,2-dimethylpyrrolidine and the like, piperidine and C-alkylpiperidines such as 2-methylpiperidine, 3-methylpiperidine, and the like, morpholine, and C-alkylmorpholines such as 2-methylmorpholine, 3-methylmorpholine and the like, thiomorpholine and C-alkylthiomorpholines such as 2-methylthiomorpholine, 3-methylthiomorpholine and the like, piperazine and C-alkylpiperazines such as 2-methylpiperazine, 3-methylpiperazine, and the like, hexamethyleneimine, homopiperazine, homomorpholine, homothiomorpholine, and the like.

The improved process of the invention makes it possible for dialkoxynitrostilbenes to be produced in markedly greater yields than heretobefore. For example, using the improved process of the invention the compound 2,5-dimethoxy-4'-nitrostilbene can be obtained in yields of the order of 80% in contrast to the yields of 35% and 38% reported in the art.

The following examples describe the manner and process of making and using the invention and set forth the best mode contemplated by the inventors of carrying out the invention but are not to be construed as limiting.

Example 1.—2,5-dimethoxy-4'-nitrostilbene

To a mixture of 83 g. (0.5 mole) of 2,5-dimethoxybenzaldehyde and 99.55 g. (0.55 mole) of p-nitrophenylacetic acid in 500 ml. of benzene was added 42.5 g. (0.5 mole) of piperidine at a temperature of about 60° C. The resulting mixture was heated under reflux (83 to 84° C.) for 3.3 hours during which time 8.6 ml. of water was collected. The resulting mixture was evaporated to remove the benzene and 250 ml. of chlorobenzene was added to the residue. The mixture so obtained was heated under reflux (132° C.) for 11.3 hours before being cooled to 0° C. The solid which had separated was isolated by filtration and dried. There was thus obtained 96 g. of 2,5-dimethoxy-4'-nitrostilbene in the form of a crystalline solid having a melting point of 117 to 118° C. and identical with an authentic sample. The mother liquor from the isolation of the above product was evaporated to dryness and the residue was triturated with 75 ml. of ethanol. The insoluble material (22.3 g.) was isolated by filtration and recrystallised from ethyl acetate to give an additional 16.8 g. of 2,5-dimethoxy-4'-nitrostilbene having a melting point of 115 to 117° C. The total yield of the latter compound was 84.1 g. representing a 79.1% yield based on 2,5-dimethoxybenzaldehyde.

Using the above procedure, but replacing 2,5-dimethoxybenzaldehyde by 2,4-dimethoxy-, 2,5-diethoxy- and 2,5 - diisopropoxybenzaldehyde, affords 2,4-dimethoxy-, 2,5-diethoxy- and 2,5-diisopropoxy- 4'-nitrostilbene, respectively, in comparable yield. Similarly, using the above procedure but replacing 4-nitrophenylacetic acid by 2-nitro- and 2,4-dinitrophenylacetic acid there are obtained 2,5 - dimethoxy - 2'-nitrostilbene and 2,5-dimethoxy-2',4'-dinitrostilbene, respectively, in comparable yield.

Example 2.—2,5-dimethoxy-4'-nitrostilbene

A mixture of 83 g. (0.5 mole) of 2,5-dimethoxybenzaldehyde and 99.5 g. (0.55 mole) of p-nitrophenylacetic acid in 500 ml. of benzene was heated to 60° C. and 8.5 g. (0.1 mole) of piperidine was added dropwise with stirring. The resulting mixture was heated under reflux (83° C.) for 6 hours during which time 8.5 ml. of water was collected. The mixture so obtained was distilled to remove the benzene and to the residue was added 350 ml. of chlorobenzene and 34 g. (0.4 mole) of piperidine. The mixture was heated under reflux (134° C.) for two hours before being cooled to 0° C. The solid which had separated was isolated by filtration and dried. There was thus obtained 89.2 g. of 2,5-dimethoxy-4'-nitrostilbene having a melting point of 116 to 117° C. The filtrate from the above isolation was evaporated to dryness and the residue was triturated with 80 ml. of ethanol. The insoluble material (23.5 g.) was isolated by filtration and recrystallised from ethyl acetate to give a further 18 g. of 2,5-dimethoxy-4'-nitrostilbene having a melting point of 115° to 117° C. The total yield of 2,5-dimethoxy-4'-nitrostilbene was 107.2 g. representing 76.2% of theoretical based on 2,5-dimethoxybenzaldehyde.

Example 3.—2,5-dimethoxy-4'-nitrostilbene

A mixture of 83 g. (0.5 mole) of 2,5-dimethoxybenzaldehyde, 42.5 g. (0.5 mole) of piperidine and 109.5 g. (0.55 mole) of p-nitrophenylacetic acid in 350 ml. of chlorobenzene was prepared at a temperature of approximately 60° C. and was heated at reflux (81° C.) under a pressure of 105 mm. of mercury. After a period of four hours heating a total of 9 g. of water had been collected. The mixture was then restored to atmospheric pressure and was heated at 132° C. until no further carbon dioxide was eliminated. The product so obtained was cooled to 0° C. and the solid which separated was isolated by filtration. There was thus obtained 79.7 g. of 2,5-dimethoxy-4'-nitrostilbene in the form of a solid having a melting point of 116 to 117° C. The filtrate from the above isolation was evaporated to dryness and the residue was treated with 80 ml. of ethanol. The insoluble material was isolated by filtration and recrystallised from ethyl acetate to give 18 g. of 2,5-dimethoxy-4'-nitrostilbene in the form of a crystalline solid having a melting point of 115° to 117° C. The total yield of 2,5-dimethoxy-4'-nitrostilbene obtained was thus 97.7 g. representing 68% theoretical based on 2,5-dimethoxybenzaldehyde.

The above procedure was repeated in all respects save that xylene was used as solvent in place of chlorobenzene and the yield of product obtained was again 68%. Similarly the above procedure was repeated in all respects save that the water was not removed from the reaction mixture during the first stage: the yield was unchanged at 68%.

Using the procedure, described in Example 3 above, but replacing piperidine by piperazine, morpholine, pyrrolidine, and 2-methylpyrrolidine, gives comparable results.

We claim:
1. In a process for the preparation of a stilbene having the formula R—CH=CH—R', wherein R represents di(lower-alkoxy)phenyl and R' represents phenyl substituted by from 1 to 2 nitro groups, by condensation of the appropriate aldehyde R—CHO and the appropriate acid R′—CH₂COOH, the improvement which comprises carrying out the reaction in two stages as follows:

(a) heating the aldehyde R—CHO and the acid R′CH₂COOH in the presence of an inert organic solvent and an alicyclic secondary amine selected from the class consisting of morpholine and piperidine at a temperature at which the aldehyde and the acid condense to form the corresponding acid

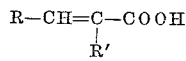

but below that at which decarboxylation of the latter occurs, until the evolution of water has substantially ceased and (b) heating the reaction mixture from the first step to a temperature at which decarboxylation of the intermediate acid occurs, until evolution of carbon dioxide is substantially complete.

2. The process which comprises the steps of (a) reacting approximately equimolar proportions of a di(lower-alkoxy)benzaldehyde and a member selected from the class consisting of mono- and di-nitrophenylacetic acids in the presence of an inert organic solvent and from about 0.1 mole to about 1.0 mole of an alicyclic secondary amine per mole of dialkoxybenzaldehyde, said amine being selected from the class consisting of morpholine and piperidine at a temperature within the range of about 65° C. to about 100° C. until elimination of water is substantially complete and, (b) heating the reaction product so obtained in the presence of a total of from about 0.5 mole to about 1.0 mole of alicyclic secondary amine per mole of di(lower-alkoxy)benzaldehyde to a temperature within the range of about 130° C. to about 170° C. until the evolution of carbon dioxide ceases whereby there is produced the corresponding dialkoxynitrostilbene.

3. The process which comprises the steps of: (a) reacting approximately equimolar proportions of a di(lower-alkoxy)benzaldehyde and a member selected from the class consisting of mono- and di-nitrophenylacetic acids in the presence of an inert organic solvent and from about 0.1 mole to about 1.0 mole of an alicyclic secondary amine per mole of dialkoxybenzaldehyde said amine being selected from the class consisting of morpholine and piperidine and said inert organic solvent forming an azeotropic mixture with water having a boiling point within the range of about 65° C. to about 100° C. and said reaction being carried out at the reflux temperature of the mixture until the further elimination of water ceases; (b) removing the solvent from the resulting mixture and, (c) heating the residue at a temperature within the range of about 130° C. to about 170° C. in the presence of a second inert organic solvent and a total of from about 0.5 to 1.0 moles of alicyclic secondary amine per mole of di(lower-alkoxy)benzaldehyde starting material, until the evolution of carbon dioxide ceases, whereby there is obtained the corresponding dialkoxynitrostilbene.

4. The process which comprises the steps of
(a) reacting approximately equimolar proportions of a di(lower-alkoxy)benzaldehyde and a member selected from the class consisting of mono- and di-nitrophenylacetic acids in the presence of an inert organic solvent and from about 0.1 mole to about 1.0 mole of an alicyclic secondary amine per mole of dialkoxybenzaldehyde, said amine being selected from the class consisting of morpholine and piperidine and said inert organic solvent having a boiling point within the range of about 130° C. to about 170° C., said reaction being conducted under reduced pressure so chosen that the reflux temperature of the reaction mixture is within the range of about 65° C. to about 100° C. and said reaction being continued until the elimination of water is substantially complete; and (b) restoring the reaction mixture to atmospheric pressure and heating said reaction mixture at approximately the boiling point of the inert solvent in the presence of a total of from about 0.5 to 1.0 moles of said alicyclic secondary amine per mole of di(lower-alkoxy)benzaldehyde starting material until the evolution of carbon dioxide ceases whereby there is obtained the corresponding dialkoxynitrostilbene.

5. A process for the preparation of 2,5-dimethoxy-4′-nitrostilbene which comprises the steps of
(a) heating at reflux approximately equimolar proportions of 2,5-dimethoxybenzaldehyde and 4-nitrophenylacetic acid in the presence of benzene and from about 0.1 mole to about 1.0 mole of an alicyclic secondary amine selected from the class consisting of morpholine and piperidine until elimination of water has substantially ceased;
(b) removing the benzene by distillation; and
(c) heating the residue at a temperature within the range of about 130° C. to about 170° C. in the presence of an inert organic solvent and a total of about 0.5 to about 1.0 mole of said alicyclic secondary amine per mole of 2,5-dimethoxybenzaldehyde employed as starting material until evolution of carbon dioxide ceases.

6. The process of claim 5 wherein the alicyclic secondary amine is piperidine.

7. A process for the preparation of 2,5-dimethoxy-4′-nitrostilbene which comprises the steps of
(a) reacting approximately equimolar proportions of 2,5-dimethoxybenzaldehyde and 4-nitrophenylacetic acid in the presence of an inert solvent having a boiling point within the range of about 130° C. to about 170° C. and from about 0.1 mole to about 1.0 mole of an alicyclic secondary amine selected from the class consisting of morpholine and piperidine, said reaction being carried out under reduced pressure and at the reflux temperature of the reaction mixture, the pressure being so chosen that the said reflux temperature lies within the range of 65° C. to 100° C., said reaction being continued until elimination of water has substantially ceased; and
(b) restoring the reaction mixture to atmospheric pressure and heating the same at reflux temperature in the presence of a total of about 0.5 to about 1.0 mole of said alicyclic secondary amine per mole of 2,5-dimethoxybenzaldehyde employed as starting material until evolution of carbon dioxide has ceased.

8. The process of claim 7 wherein the alicyclic secondary amine is piperidine.

9. The process of claim 8 wherein the inert organic solvent is chlorobenzene.

References Cited
UNITED STATES PATENTS 2,469,415    5/1949    Schwenk et al. _____ 260—520
3,019,107    1/1962    Blout et al.

BERNARD HELFIN, *Primary Examiner.*